(12) United States Patent
Jennings et al.

(10) Patent No.: US 7,726,350 B2
(45) Date of Patent: Jun. 1, 2010

(54) ENERGY ABSORBING WEBBINGS (75) Inventors: John E. Jennings, Anniston, AL (US); Timothy M. Russell, Anniston, AL (US)

(73) Assignee: YKK Corporation of America, Marietta, GA (US)

( * ) Notice: Subject to any disclaimer, the term of this patent is extended or adjusted under 35 U.S.C. 154(b) by 41 days.

(21) Appl. No.: 12/063,960

(22) PCT Filed: Aug. 16, 2005

(86) PCT No.: PCT/US2005/029140

§ 371 (c)(1),
(2), (4) Date: Aug. 7, 2008

(87) PCT Pub. No.: WO2007/021278

PCT Pub. Date: Feb. 22, 2007

(65) Prior Publication Data

US 2009/0114307 A1 May 7, 2009

(51) Int. Cl.
*A47L 3/04* (2006.01)
*A62B 1/16* (2006.01)
*A62B 35/04* (2006.01)
*D03D 11/02* (2006.01)
*D03D 23/00* (2006.01)
*D03D 17/00* (2006.01)

(52) U.S. Cl. .............. 139/383 R; 139/387 R; 139/383 B; 182/3; 182/4; 182/5; 182/6; 182/7

(58) Field of Classification Search ........... 66/192, 66/195, 193; 182/3–8; 139/383 R, 384 R, 139/387 R, 397, 407, 420 R, 426 R, 383 B
See application file for complete search history.

(56) References Cited

U.S. PATENT DOCUMENTS

| 3,444,957 | A | * | 5/1969 | Ervin, Jr. .................. 182/3 |
| 3,550,956 | A | | 12/1970 | Lowe |
| 3,550,957 | A | | 12/1970 | Radke et al. |

(Continued)

FOREIGN PATENT DOCUMENTS

EP 0034458 8/1981

(Continued)

OTHER PUBLICATIONS

PCT/US2009/033431 International Search Report and Written Opinion dated May 8, 2009.

(Continued)

*Primary Examiner*—Bobby H Muromoto, Jr.
(74) *Attorney, Agent, or Firm*—Kilpatrick Stockton, LLP (57) ABSTRACT

A tear-away energy absorbing webbing (10) is a one-piece webbing. The tear-away energy absorbing webbing (10) has a top layer load-bearing web (12) and a bottom layer load-bearing web (24). An energy absorbing portion (38) of the webbing has binder yarns (36) interlaced with the top and bottom layer load-bearing webs (12, 14). A sufficiently high load force applied to the webbing breaks the binder yarns (36) and tears apart the top and bottom layer load-bearing webs (12, 14). The energy absorbing portion (38) absorbs energy as it tears apart. The top and bottom layer load-bearing webs (12, 14) support the load force when the shock absorbing portion is torn apart.

27 Claims, 7 Drawing Sheets

U.S. PATENT DOCUMENTS

| | | | |
|---|---|---|---|
| 3,804,698 A | 4/1974 | Kinloch | |
| 3,861,744 A | 1/1975 | Yamada et al. | |
| 3,872,895 A | 3/1975 | Takada | |
| 3,978,894 A * | 9/1976 | Boone | 139/383 R |
| 3,997,190 A | 12/1976 | Seiffert et al. | |
| 4,004,616 A | 1/1977 | Andronov et al. | |
| 4,138,157 A | 2/1979 | Pickett et al. | |
| 4,209,044 A | 6/1980 | Taki | |
| 4,253,544 A | 3/1981 | Dalmaso | |
| 4,515,254 A * | 5/1985 | Markov et al. | 188/371 |
| 4,538,702 A | 9/1985 | Wolner | |
| 4,571,765 A | 2/1986 | Okada et al. | |
| 4,604,315 A | 8/1986 | McCall et al. | |
| 4,618,026 A | 10/1986 | Olson | |
| 4,662,487 A | 5/1987 | Koch | |
| 4,745,883 A | 5/1988 | Baggetta | |
| 4,746,769 A | 5/1988 | Piper | |
| 4,853,175 A | 8/1989 | Book, Sr. | |
| 4,853,275 A | 8/1989 | Tracy et al. | |
| 4,897,902 A | 2/1990 | Kavesh et al. | |
| 5,027,477 A | 7/1991 | Seron | |
| 5,113,981 A | 5/1992 | Lantz | |
| 5,143,187 A | 9/1992 | McQuarrie et al. | |
| 5,174,410 A | 12/1992 | Casebolt | |
| 5,202,177 A * | 4/1993 | Kamper | 442/186 |
| 5,287,943 A | 2/1994 | Bell | |
| 5,433,290 A | 7/1995 | Ellis et al. | |
| 5,464,252 A | 11/1995 | Kanazawa et al. | |
| 5,478,636 A | 12/1995 | Koseki | |
| 5,529,343 A * | 6/1996 | Klink | 280/805 |
| 5,564,476 A | 10/1996 | Golz | |
| 5,598,900 A | 2/1997 | O'Rourke | |
| 5,658,012 A | 8/1997 | Villarreal et al. | |
| 5,799,760 A | 9/1998 | Small | |
| 6,006,860 A | 12/1999 | Bell | |
| 6,085,802 A | 7/2000 | Silberberg | |
| 6,283,167 B1 | 9/2001 | Chang et al. | |
| 6,299,040 B1 | 10/2001 | Matias | |
| 6,347,466 B1 | 2/2002 | Lackner et al. | |
| 6,390,234 B1 | 5/2002 | Boyer | |
| 6,533,066 B1 * | 3/2003 | O'Dell | 182/3 |
| 6,648,101 B2 | 11/2003 | Kurtgis | |
| 6,739,427 B2 | 5/2004 | Gayetty | |
| 6,776,317 B1 | 8/2004 | Parker | |
| 2002/0180199 A1 | 12/2002 | Schneider et al. | |
| 2003/0069557 A1 | 4/2003 | Driskell et al. | |
| 2003/0173150 A1 | 9/2003 | Sharp | |
| 2004/0173276 A1 | 9/2004 | Horikawa | |
| 2005/0056335 A1 | 3/2005 | Tielemans et al. | |
| 2005/0189169 A1 | 9/2005 | Tanaka et al. | |
| 2006/0027277 A1 * | 2/2006 | Jennings et al. | 139/408 |
| 2007/0210639 A1 | 9/2007 | Berger et al. | |
| 2008/0190691 A1 | 8/2008 | Tanaka et al. | |
| 2009/0023352 A1 | 1/2009 | Russell et al. | |

FOREIGN PATENT DOCUMENTS

| | | |
|---|---|---|
| EP | 0128662 A2 | 12/1984 |
| EP | 0496028 | 7/1992 |
| EP | 0665142 B1 | 11/1996 |
| EP | 0851779 B1 | 8/2000 |
| EP | 1069008 | 1/2001 |
| EP | 0923403 B1 | 4/2003 |
| JP | 05-084317 | 4/1993 |
| JP | 05-141102 | 6/1993 |
| JP | 06-081244 | 3/1994 |
| JP | 07-246909 | 9/1995 |
| JP | 08-182770 | 7/1996 |
| WO | WO-93/12838 | 7/1993 |
| WO | WO-97/10876 | 3/1997 |
| WO | WO-98/41284 | 9/1998 |
| WO | WO-01/26738 | 4/2001 |
| WO | WO-2007011336 | 1/2007 |
| WO | WO-2007/021278 | 2/2007 |

OTHER PUBLICATIONS

CN2005800516029 First Office Action dated Jul. 17, 2009 with English translation.

PCT/US05/25043 International Search Report mailed Nov. 1, 2005.

PCT/US05/29140 International Search Report mailed Jan. 13, 2006.

* cited by examiner

ENERGY ABSORBING WEBBINGS

BACKGROUND OF THE INVENTION

The present invention generally pertains to webbings. More specifically, the present invention pertains to energy absorbing webbings and tear-away shock absorbing webbings. One energy absorbing webbing is a one-piece webbing having two load-bearing webs connected together by binder yarns. The two load-bearing webs and the binder yarns are woven together as a one-piece webbing. During activation of the webbing, the binder yarns break as the two webs tear apart from each other and absorb energy or shock. The two torn-apart separate load-bearing webs support the load applied to the webbing. The present invention further pertains to methods of making energy absorbing webbings and methods of using energy absorbing webbings. The present invention provides improved webbings which can absorb energy and support a load.

The present invention is described as being energy absorbing as well as shock absorbing. Use of the terms "energy absorbing" and "shock absorbing" are not intended to limit the present invention. Accordingly, where an embodiment is described as "shock absorbing" the invention is regarded as also pertaining to "energy absorbing" and vise versa.

In some embodiments, the present invention pertains to shock absorbing lanyards, methods of making shock absorbing lanyards and methods of using shock absorbing lanyards. The present invention can provide improved lanyards which can absorb energy and support a load.

People who are at elevated positions above a floor or other relatively lower surface can be at risk of falling and injury. For example, workers and other personnel who have occupations which require them to be at elevated positions, such as on scaffolding, can be at risk of falling and injury. Safety harnesses can be worn to stop a person's fall and prevent or reduce injury.

Safety harnesses typically have a harness portion worn by the user and a tether or lanyard extending from the harness portion. The lanyard connects the harness portion to a secure structure. If the person falls from the elevated position, the safety harness stops the person's fall when the lanyard is straightened. The person's fall is stopped rather abruptly and the person is subjected to the shock force of the abrupt stop. Accordingly, needs exist to improve lanyards which reduce the shock experienced by the users of safety harnesses when a fall is stopped.

Tear-away lanyards which attempt to absorb the shock of a person's fall are known. However, needs exist for improved tear-away lanyards which reduce the shock of stopping a person's fall. Current tear-away lanyards have been made from two separate webbings which are assembled together. The webbings include a strength webbing and a separate tear-away webbing. The tear-away webbing is attached to the strength webbing by sewing. During use of the lanyard, the tear-away webbing is torn apart under the load of a falling user. The strength webbing supports the user after the tear-away webbing is torn apart.

Those existing tear-away lanyards exhibit disadvantages and can be improved. For example, the tear-away lanyards are made from two separate webbings (the strength webbing and the tear-away webbing) which must be assembled together. The two separate webbings increase the cost of the lanyard. Also, the process of assembling the two separate webbings increases the cost of the lanyard. Assembly steps of attaching the tear-away webbing to the strength webbing, such as by sewing, is required. The existing tear-away lanyards having a tear-away webbing and a separate strength webbing are costly and tedious to manufacture.

Another existing tear-away lanyard has had a pre-cut slit in a webbing. The webbing tears longitudinally beginning at the pre-cut slit. Another tear-away lanyard has a piercing or cutting member in the webbing. The piercing or cutting member tears the webbing longitudinally. Those existing lanyards also exhibit disadvantages and can be improved. For example, the longitudinal tearing or cutting of the webbing can be inconsistent and difficult to control. The tearing or cutting action can be rather unpredictable. Accordingly, the amount of force required to activate the lanyard can be inconsistent and unpredictable.

For the reasons mentioned above and for other reasons, lanyards and shock absorbing lanyards can be improved. Furthermore, methods of making lanyards can also be improved.

Energy absorbing webbings and methods of making energy absorbing webbings can be improved as well.

SUMMARY OF THE INVENTION

New energy absorbing webbings are provided by the present invention. The present invention particularly provides new tear-away shock absorbing lanyards. The present invention also provides new methods of making lanyards. The new lanyards can be used to stop a person's fall and reduce a shock force felt by the user when the fall is stopped.

In an embodiment, one webbing has a first load-bearing web, a second load-bearing web, and binder members integrally formed with the first and second load-bearing webs as a one-piece webbing. The binder members connecting the first and second load-bearing webs together at an energy absorbing portion. The first and second load-bearing webs are separated from each other at the energy absorbing portion by fracture of the binder members when a sufficient load is applied to the webbing.

The binder members can be binder yarns interlaced with the first and second load-bearing webs.

The first and second load-bearing webs can be separated from each other after fracture of the binder members such that the first and second load-bearing webs both support the load applied to the webbing.

In the webbing, the first load-bearing web may have a left web end and a right web end, the second load-bearing web may have a left web end and a right web end. The left web end of the first load-bearing web is connected to the right web end of the second load-bearing web; and the right web end of the first load-bearing web is connected to the left web end of the second load-bearing web.

The energy absorbing portion may extend toward opposite ends of the webbing from a center of the webbing.

Fracture of the binder members may start at opposite ends of the energy absorbing portion and continue from both opposite ends toward a center of the energy absorbing portion.

The first and second load-bearing webs may exchange with each other such that the first load-bearing web changes from a top side of the webbing to a bottom side of the webbing, and the second load-bearing web changes from the bottom side of the webbing to the top side of the webbing. The top and bottom load-bearing webs may exchange within the energy absorbing portion or outside of the energy absorbing portion.

In the webbing having the web exchange, the top side of the webbing may have a left web end and a right web end, and the bottom side of the webbing may have a left web end and a right web end. The left and right web ends of the top side are connected together, and the left and right web ends of the bottom side are connected together.

The first and second load-bearing webs may have ground yarns. The ground yarns of the first load-bearing web may exchange with the ground yarns of the second load-bearing web. A top side of the webbing may have a left web end and a right web end, and a bottom side of the webbing may have a left web end and a right web end. The left and right web ends of the top side are connected together, and the left and right web ends of the bottom side are connected together.

An amount of binder members connected to the first and second load-bearing webs may vary along the energy absorbing portion.

The energy absorbing portion may have a beginning fracture location and an ending fracture location, and there may be fewer binder members connected to the first and second load-bearing webs juxtaposed the beginning fracture location than binder members connected to the first and second load-bearing webs juxtaposed the ending fracture location.

The first and second load-bearing webs may be woven materials, knitted materials and combinations thereof.

In another embodiment a webbing has a top layer load-bearing web having yarns, a bottom layer load-bearing web having yarns, and binder yarns connecting the top and bottom layer load-bearing webs together at an energy absorbing portion of the webbing. The top and bottom layer load-bearing webs are separable from each other at the energy absorbing portion by release of the binder yarns. The top and bottom layer load-bearing webs and the binder yarns are formed together as a one-piece webbing.

The top and bottom layer load-bearing webs may be woven materials, knitted materials and combinations thereof.

The binder yarns may be integrally interlocked with the yarns of the top and bottom layer load-bearing webs.

The top and bottom layer load-bearing webs may be separated from each other at the energy absorbing portion by fracture of the binder yarns members when a sufficient load is applied to the webbing such that the top and bottom layer load-bearing webs both support the load applied to the webbing.

The top and bottom layer load-bearing webs may exchange with each other such that yarns of the top layer load-bearing web change from a top side of the webbing to a bottom side of the webbing, and yarns of the bottom layer load-bearing web change from the bottom side of the webbing to the top side of the webbing.

The top and bottom layer load-bearing webs may exchange within the energy absorbing portion.

In another embodiment, a tear-away webbing has a first load-bearing web having a left web end and a right web end, a second load-bearing web having a left web end and a right web end, and binder members releasably connecting the first and second load-bearing webs together at an energy absorbing portion of the tear-away webbing. The left web end of the first load-bearing web is connected to the right web end of the second load-bearing web, and the right web end of the first load-bearing web is connected to the left web end of the second load-bearing web.

The first and second load-bearing webs and the binder members may be formed integrally as a one-piece webbing.

The binder members may be fracturable binder yarns.

The binder members may be binder yarns interlocked with yarns of the first and second load-bearing webs.

In another embodiment, a tear-away webbing has a top side load-bearing web having a left web end and a right web end, a bottom side load-bearing web having a left web end and a right web end, an exchange portion where a portion of the top side load-bearing web exchanges with a portion of the bottom side load-bearing web, and binder members releasably connecting the top and bottom side load-bearing webs together at an energy absorbing portion of the tear-away webbing. The left web end of the top side load-bearing web is connected to the right web end of the top side load-bearing web, and the left web end of the bottom side load-bearing web is connected to the right web end of the bottom side load-bearing web.

The exchange portion may be within the energy absorbing portion.

The portions of top and bottom side load-bearing webs that exchange may be yarns of the top and bottom side load-bearing webs.

The top and bottom side load-bearing webs and the binder members may be formed integrally as a one-piece webbing.

The binder members may be fracturable binder yarns.

The binder members may be binder yarns interlocked with yarns of the top and bottom side load-bearing webs.

One advantage of the present invention is to provide improved webbings, such as, improved energy or shock absorbing webbings and improved tear-away shock absorbing webbings.

An advantage of the present invention is to provide a one-piece tear-away energy absorbing webbing.

Another advantage of the present invention is to provide improved tear-away energy absorbing webbings which have top and bottom layer load-bearing webs and shock absorbing binder yarns woven together as a one-piece webbing.

Yet another advantage of the present invention is to provide lanyards which can stop a person's fall while reducing the shock force to the person.

Further advantages of the present invention are to improve manufacturing of webbings and reduce costs of webbings.

Another advantage of the present invention is to provide an energy absorbing webbing made of a one-piece webbing that is torn apart during activation into two load-bearing webs.

An even further advantage of the present invention is to control the activation forces of energy absorbing webbings.

A further advantage of the present invention is to provide load limiters.

Yet another advantage of the present invention is to provide improved seat belt systems.

Additional features and advantages of the present invention are described in, and will be apparent from, the following Detailed Description of the Invention and the figures. The features and advantages may be desired, but, are not necessarily required to practice the present invention.

DETAILED DESCRIPTION OF THE INVENTION

The present invention provides new webbings. The present invention particularly provides new energy absorbing webbings and new tear-away shock absorbing webbings which can absorb energy when a force is applied to the webbing. When an abrupt force is applied to the webbing, the present invention can reduce the shock of the force. One new tear-away shock absorbing webbing according to the present invention is a one-piece webbing having a top layer load-bearing web and a bottom layer load-bearing web connected together by binder yarns. The top and bottom layer load-bearing webs and the binder yarns may be simultaneously woven as a one-piece webbing. The top and bottom layer load-bearing webs are torn apart during activation of the webbing by fracture of the binder yarns to absorb energy or shock. The two torn apart load-bearing webs support the load applied to the webbing. For example, the torn-apart webs can stop a person's fall and support the final load. The present invention, however, can be practiced in many different embodiments.

Figure 1:
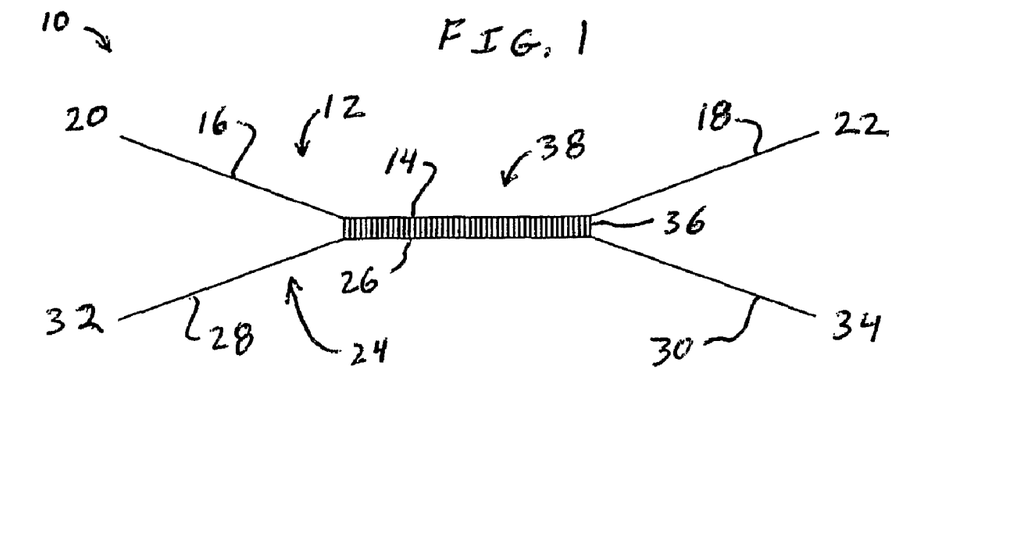
FIG. 1 is a schematic illustration of a tear-away energy absorbing webbing according to the principles of the present invention.

An example of the present invention is shown in FIG. 1 which shows a tear-away shock absorbing webbing 10. The tear-away shock absorbing webbing 10 has a top layer load-bearing web 12, having a binder segment 14 and arm segments 16 and 18 extending from the binder segment 14. The arm segment 16 has a web end 20 and the arm segment 18 has a web end 22. The tear-away shock absorbing webbing 10 also has a bottom layer load-bearing web 24, having a binder segment 26 and arm segments 28 and 30 extending from the binder segment 26. The arm segment 28 has a web end 32 and the arm segment 30 has a web end 34. The top layer load-bearing web 12 and the bottom layer load-bearing web 24 are connected together by binder yarns 36 along a portion of the webbing 10. The portion of the webbing 10 having the binder yarns 36 connecting the top and bottom layer load-bearing webs 12, 24 together along the binder segments 14, 26 is a shock absorbing portion 38 of the webbing 10.

Figure 2:
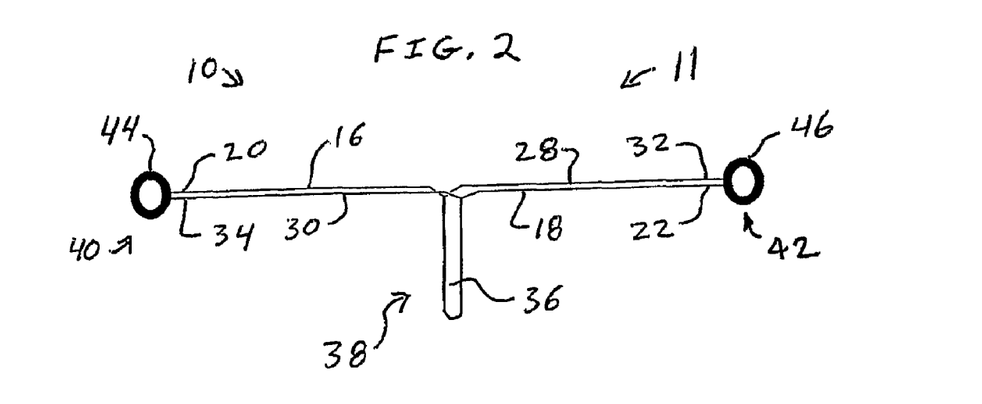
FIG. 2 is a schematic illustration of a tear-away shock absorbing lanyard ready for use.

Referring also to FIG. 2, one embodiment of the webbing 10 is a tear-away shock absorbing lanyard 11. The web end 20 of the arm segment 16 of the top layer load-bearing web 12 is connected to the web end 34 of the arm segment 30 of the bottom layer load-bearing web 24. Similarly, the web end 22 of the arm segment 18 of the top layer load-bearing web 12 is connected to the web end 32 of the arm segment 28 of the bottom layer load-bearing web 24. The web ends 20 and 34 connected together define a lanyard end 40, and the web ends 22 and 32 connected together define a lanyard end 42. Hardware connectors 44, 46, for example metal clasps, can be provided at the lanyard ends 40, 42 for connecting the respective web ends 20, 34 and 22, 32 together and/or for attaching the tear-away shock absorbing lanyard 11 to other devices or structures.

Figure 3:
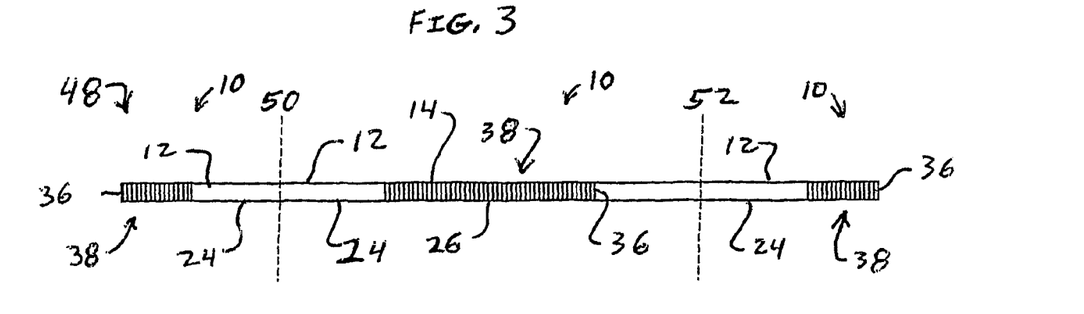
FIG. 3 is a schematic illustration of the tear-away energy absorbing webbing of FIG. 1 during manufacture.

FIG. 3 shows the tear-away shock absorbing webbing 10 during manufacture. A continuous webbing 48 comes off of a loom and has continuous multiple tear-away shock absorbing lanyards 10. The continuous webbing 48 is cut at cut locations 50, 52 to form an individual tear-away shock absorbing webbing 10. The continuous webbing 48 and the tear-away shock absorbing webbing 10 are formed as one-piece webbings. The top and bottom layer load-bearing webs 12, 24 and the binder yarns 36 are simultaneously woven together to form a one-piece webbing, such as an individual tear-away shock absorbing webbing 10 or the continuous webbing 48. However, an individual webbing 10 and the continuous webbing 48 could be made from materials having any desired structure, for example, woven materials, knitted materials and combinations thereof. Also, the webbing 10 could be assembled from separate components rather than woven as a one-piece webbing. The lanyard 11 of FIG. 2 can also be made as shown in FIG. 3 as well.

The top layer load-bearing web 12 and the bottom layer load-bearing web 24 are connected together along the binder segments 14, 26. For example, binder yarns 36 can be integrally woven or interlaced together with the top and bottom layer load-bearing webs 12, 24. The binder yarns 36 are intended to be fractured during activation or deployment of the tear-away shock absorbing webbing 10 when sufficient force is applied to the webbing 10 which is explained further below. Another example of the structure of the binder yarns 36 connected to the top and bottom layer load-bearing webs 12, 24 is by stitching the load-bearing webs 12, 24 together with the binder yarns 36. The binder yarns 36 are one example of binder members or energy absorbing members suitable for use with the present invention. Examples of other suitable binder members or energy absorbing members include hook and loop fasteners, adhesives, and the like. The binder members or energy absorbing members may be integrally formed with the top and bottom load-bearing webs such that the top and bottom load-bearing webs and the binder members form a one-piece webbing. Alternatively, the binder members can be made separate from the top and bottom load-bearing webs and attached to the top and bottom load-bearing webs. The binder members or energy absorbing members are intended to absorb energy or forces applied to the webbing during activation of the webbing. Also, the binder members or the energy absorbing members allow for separation of the joined two load-bearing webs into two separate webbings supporting the load applied to the webbing. In other words, if the energy applied to the webbing 10 is sufficient to tear through the entire tear-away portion of the binder yarns 36, then the two load-bearing webs 12, 24 stop the action of the load and support the final load.

Figure 4:
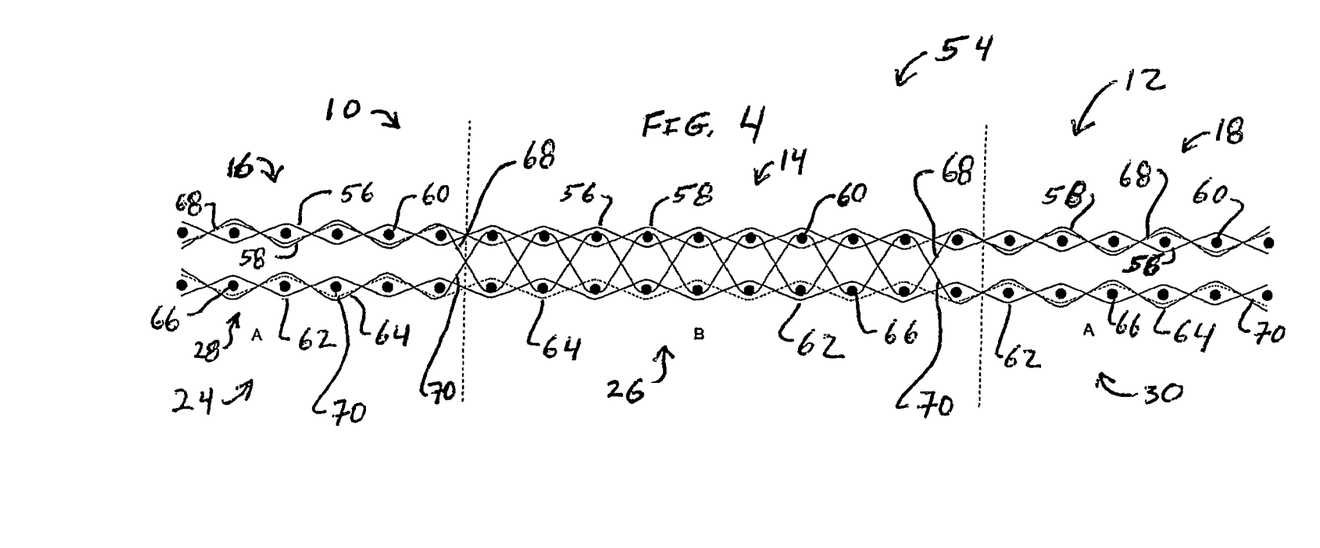
FIG. 4 shows a weaving pattern of the tear-away energy absorbing webbing of FIG. 1.

FIG. 4 shows a weaving pattern 54 of the tear-away shock absorbing webbing 10. The weaving pattern 54 has ground yarns 56, 58 and weft yarns 60 which form the top layer load-bearing web 12 of the tear-away shock absorbing webbing 10. The weaving pattern 54 also has ground yarns 62, 64 and weft yarns 66 which form the bottom layer load-bearing web 24. Binder yarns 68, 70 are interlaced with the ground yarns 56, 58, 62, 64 and the weft yarns 60, 66 and bind the top and bottom layer load-bearing webs 12, 24 together. The weave type, warp density, warp material size and type, weft density, weft material size and type, and the binder yarn material size and type can be selected or varied as desired. Also, other yarns or components could be included in a webbing having the weaving pattern 54.

The example weaving pattern 54 shown in FIG. 4 has two main types of segments, weaving segments A and B. Weaving segment A on the left side of FIG. 4 forms the arm segments 16, 28 shown in FIG. 1. Likewise, weaving segment A on the right side of FIG. 4 forms the arm segments 18, 30. In weaving segment A, the binder yarns 68 are woven with the ground yarns 56, 58 and the binder yarns 70 are woven with the ground yarns 62, 64. Weaving segment B forms the shock absorbing portion 38 shown in FIG. 1. In the weaving segment B, the binder yarns 68, 70 are woven with the ground yarns 56, 58, 62, 64 to interlock the top and bottom layer load-bearing webs 12, 24.

Referring to FIG. 2, the tear-away shock absorbing lanyard 11 is shown in a condition ready for use, and can be used as a fall protection device, for example. The shock absorbing portion 38 is folded or gathered neatly into a package. One of the lanyard ends 40 or 42 is securely attached to a safety harness worn by a user. The opposite lanyard end 40 or 42 is securely attached to a fixed structure or other load-supporting structures. If the user falls, the tear-away shock absorbing lanyard 11 stops the person's fall and reduces the shock felt by the person as the user is quickly brought to a stop.

Figure 5:
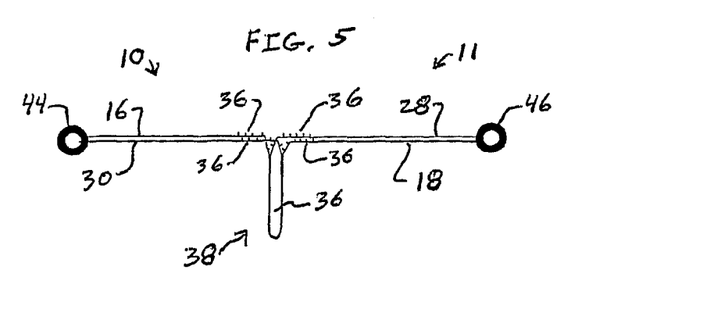
FIG. 5 is a schematic illustration of the tear-away shock absorbing lanyard of FIG. 2 during activation.

Referring also to FIG. 5, as the person falls, the binder yarns 36 in the shock absorbing portion 38 begin to fracture under the load force of the falling user. All of the binder yarns 36 do not fracture simultaneously. Rather, the binder yarns 36 fracture successively along the length of the shock absorbing portion 38 as the shock absorbing portion 38 straightens and tears apart. The webbing 10 and lanyard 11 tears apart by the top and bottom layer load-bearing webs 12, 24 tearing apart from each other along the lengths of the binder segments 14, 26 as the shock absorbing portion 38 straightens. In the example of FIG. 5, the binder yarns 36 begin fracturing at both of the opposite ends of the shock absorbing portion 38. The shock absorbing portion 38 tears apart from both opposite ends towards the middle of the shock absorbing portion 38. The tearing action of the binder yarns 36 absorb energy, decelerate the person's fall, and reduce the shock of stopping the user's fall.

Figures 6, 8, 10, 11:
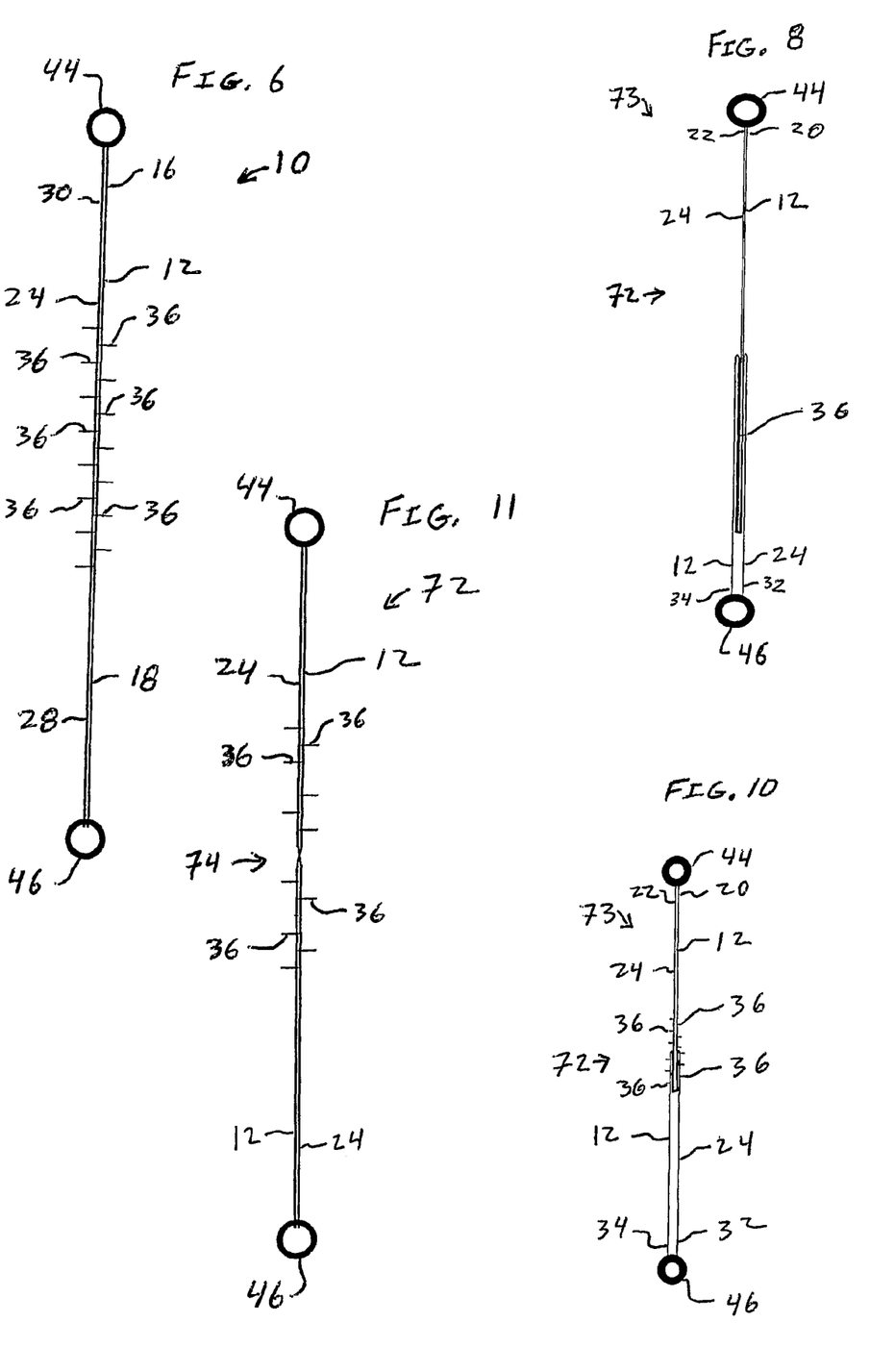
FIG. 6 is a schematic illustration of the tear-away shock absorbing lanyard of FIG. 2 after use.
FIG. 8 is a schematic illustration of another tear-away shock absorbing lanyard ready for use.
FIG. 10 is a schematic illustration of the tear-away shock absorbing lanyard of FIG. 8 during activation.
FIG. 11 is a schematic illustration of the tear-away shock absorbing lanyard of FIG. 8 after use.

Referring to FIG. 6, the tear-away shock absorbing lanyard 11 and the webbing 10 are shown in a state of being completely torn apart. All of the binder yarns 36 have been fractured. The top and bottom layer load-bearing webs 12, 24 stop the person from falling further and support the load of the person. The one-piece lanyard 11 essentially becomes two load-bearing webs when the lanyard 11 is torn apart. The shock of stopping the fall that would otherwise be felt by the falling person is reduced or cushioned by the energy-absorbing, shock absorbing portion 38 of the lanyard 11.

Figure 7:
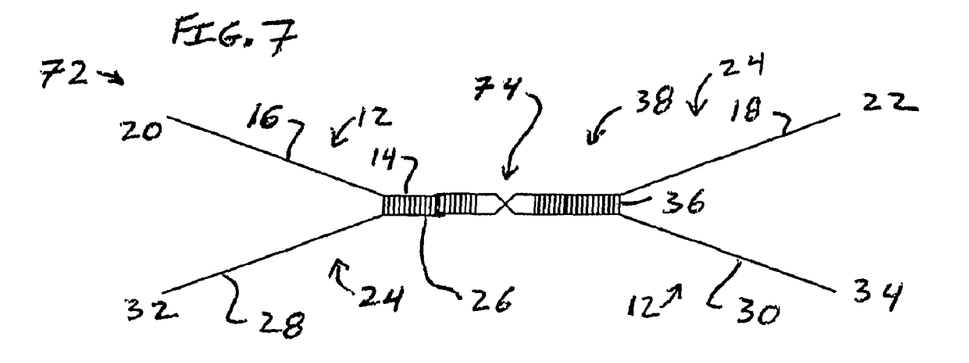
FIG. 7 is a schematic illustration of another tear-away energy absorbing webbing according to the principles of the present invention.

Another tear-away shock absorbing webbing 72 according to the present invention is schematically shown in FIG. 7. The tear-away shock absorbing webbing 72 is similar to the tear-away shock absorbing webbing 10 of FIG. 1 except the top and bottom layer load-bearing webs 12, 24 exchange at about the midpoint 74 of the binder segments 14, 26. The weaving of the webbing 72 has the top layer load-bearing web 12 woven to the bottom at the midpoint 74. Also, the bottom layer load-bearing web 24 is woven to the top at the midpoint 74. Accordingly, the top and bottom layer load-bearing webs 12, 24 exchange with each other.

One feature of the tear-away shock absorbing webbing 72 is that a twist which occurs in the lanyard 11 (FIG. 2) made from the webbing 10 (FIG. 1) is avoided. The twist in the lanyard 11 occurs when the web ends 20 and 34 are connected together and the web ends 22 and 32 are connected together (FIG. 2). FIG. 8 shows a lanyard 73 made from the webbing 72 and without the twist. In the lanyard 73, the web ends 20, 22, 32, 34 of the arm segments 16, 18, 28, 30 are connected together differently compared to the lanyard 11. The lanyard 73 has the web ends 20 and 22 connected together and the web ends 32 and 34 connected together.

Figure 9:
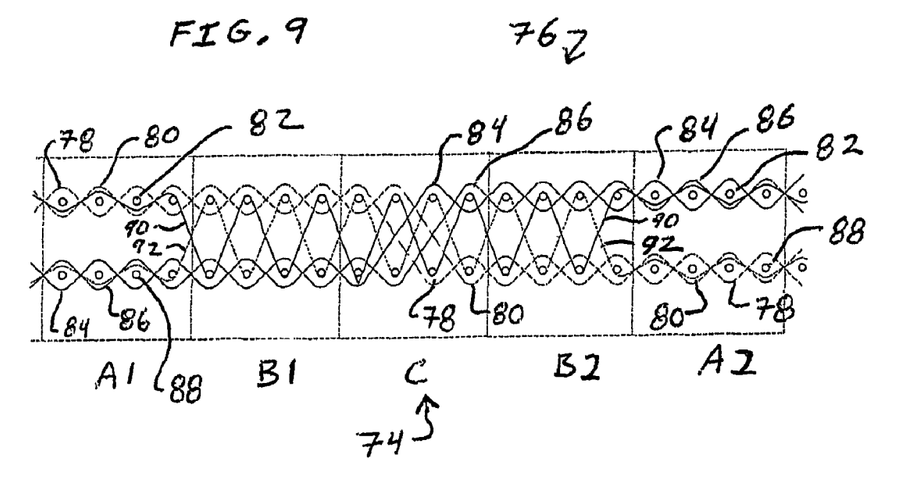
FIG. 9 shows a weaving pattern of the tear-away energy absorbing webbing of FIG. 7.

FIG. 9 shows a weaving pattern 76 of the tear-away shock absorbing webbing 72 and the tear-away shock absorbing lanyard 73. The weaving pattern 76 has ground yarns 78, 80 and weft yarns 82 which form the top layer load-bearing web 12 of the tear-away shock absorbing webbing 72. The weaving pattern 76 also has ground yarns 84, 86 and weft yarns 88 which form the bottom layer load-bearing web 24. The top and bottom layer load-bearing webs 12, 24 exchange in the weaving pattern 76. More specifically, the ground yarns 78, 80 are woven from the top layer load-bearing web 12 to the bottom layer load-bearing web 24 and the ground yarns 84, 86 are woven from the bottom layer load-bearing web 24 to the top layer load-bearing web 12. Binder yarns 90, 92 are interlaced with the ground yarns 78, 80, 84, 86 and the weft yarns 82, 88 and bind the top and bottom layer load-bearing webs 12, 24 together. The weave type, warp density, warp material size and type, weft density, weft material size and type, and the binder yarn material size and type can be selected or varied as desired. Also, other yarns or components could be included in a webbing having the weaving pattern 76.

The example weaving pattern 76 shown in FIG. 9 has five main types of segments, weaving segments A1, B1, C, B2 and A2. Weaving segments A1, A2 of FIG. 9 form the arm segments 16, 28 and 18, 30 shown in FIG. 7 and are similar to the weaving segments A, A of FIG. 4. Weaving segments B1, C, B2 of FIG. 9 form the shock absorbing portion 38 shown in FIG. 7. In the weaving segments B1, C, B2, the binder yarns 90, 92 are woven with the ground yarns 78, 80, 84, 86 to interlock the top and bottom layer load-bearing webs 12, 24 as is shown in weaving segment B of FIG. 4. Weaving segment C of FIG. 9 is an exchange segment where the top and bottom layer load-bearing webs 12, 24 exchange, see the midpoint 74 of FIG. 7. In weaving segment C, the ground yarns 78, 80 weave from the top layer load-bearing web 12 to the bottom layer load-bearing web 24 and the ground yarns 84, 86 weave from the bottom layer load-bearing web 24 to the top layer load-bearing web 12. Weaving segments A1 and A2 have basically the same structure, except for the exchange of the yarns. This also applies for weaving segments B1 and B2. Accordingly, in this example of the tear-away shock absorbing webbing 72 the top and bottom layer load-bearing webs 12, 24 exchange with each other.

Referring to FIGS. 8 and 10, the lanyard 73 made from the tear-away shock absorbing webbing 72, having the top and bottom layer load-bearing webs 12, 24 exchange, operates similar to the webbing 10 and lanyard 11 described above. The lanyard 73 can be folded or gathered into a compact package similar as shown in FIG. 8. As a sufficiently high load force is applied to the lanyard 73, the lanyard 73 tears apart to absorb energy and the shock of stopping a person from falling. FIG. 10 shows the lanyard 73 during activation, i.e., partially torn apart. FIG. 11 shows the tear-away shock absorbing lanyard 73 after being completely torn apart and supporting a load. The binder yarns 90, 92 are fractured and the lanyard 73 supports the load from falling further.

The weaving pattern 76 shown in FIG. 9 is one example of cross-over or exchange weaving patterns for the tear-away shock absorbing webbing. An additional exchange of the ground yarns 78, 80 with the ground yarns 84, 86 could be located elsewhere along the webbing than at weaving segment C. For example, the additional exchange can occur in a portion of the weaving segment A. In this embodiment, the weaving pattern would include, for example, from left to right, segment A1—additional exchange segment—segment A1-segment B1-segment C, etc.

Tear-away shock absorbing webbings according to the present invention can be designed to have a desired activation force, i.e. the force required to activate and tear apart the shock absorbing portion 38 (FIGS. 1 and 7) of the webbing. The shock absorbing portion 38 can have various structures which provide for different activation forces. Examples of different activation forces for a particular webbing are a constant force and a variable force. Various features of the tear-away shock absorbing webbing can be varied to achieve a particular activation force or force profile.

For example, various features of the shock absorbing portion 38 can be varied to provide a desired activation force. The type of binder yarns, strength of the binder yarns, number of binder yarns, weaving pattern of the binder yarns, and other binder yarn parameters can be selected as desired to provide desired activation forces.

Figure 12:
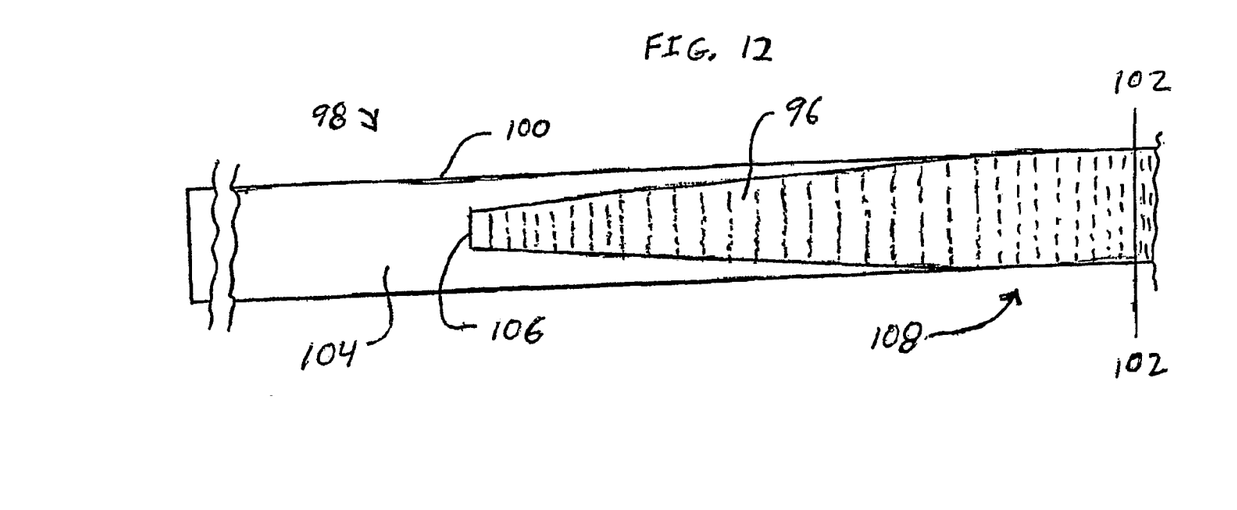
FIG. 12 is a schematic illustration of one binder yarn pattern according to the present invention.

FIG. 12 shows a schematic plan view of one binder yarn pattern 96 (shaded portion of FIG. 12). FIG. 12 is a plan view from above a tear-away shock absorbing webbing 98 looking down at the width or face 100 of the webbing 98. FIG. 12 actually shows only a portion of the webbing 98 from a center 102 extending to the left toward one end of the webbing. A mirror image of the illustration in FIG. 12 would extend from the center 102 to the right toward an opposite end of the webbing. The binder yarn pattern 96 is where the binder yarns interlock the top and bottom layer load-bearing webs 12, 24 together. The non-shaded portion 104 of FIG. 12 is where the binder yarns do not interlock the top and bottom layer load-bearing webs 12, 24 together. Rather, the binder yarns are woven with their respective top or bottom webs 12, 24 and the top and bottom webs are not interlocked together. The binder yarn pattern 96 forms a wedge shape as shown in the example of FIG. 12. However, other desired shapes or patterns can be used.

One feature of the binder yarn pattern of FIG. 12 is that the webbing 98 has a variable activation force required to tear-apart the top and bottom layer load-bearing webs 12, 24. During activation of the webbing 98, the binder yarns will begin fracturing at the opposite ends 106 (only one end 106 is shown in FIG. 12) of the binder yarn pattern 96. As the webbing 98 is activated (torn apart), the binder yarns fracture from the end 106, along the binder yarn pattern 96, to the center 102. The number of binder yarns interlocking the top and bottom layer load-bearing webs 12, 24 increases from the end 106 to the center 102. In other words, there are fewer binder yarns connected to the top and bottom layer load-bearing webs 12, 24 juxtaposed the beginning fracture location (end 106) than binder yarns connected to the top and bottom layer load-bearing webs 12, 24 juxtaposed the ending fracture location (center 102). The increase in the number of interlocking binder yarns increases the number of binder yarns which must be fractured and thus, increases the activation force required to tear apart the top and bottom layer load-bearing webs 12, 24. The amount of energy absorbed by the webbing 98 increases as the tearing action progresses. The user of a lanyard made from the webbing 98 will be subjected to a more gradually increasing stopping force as the webbing 98 stops the user's fall. This further reduces the shock felt by the user.

The change of the activation force of the webbing 98 (such as the rate of increase of the activation force) can be customized or designed to provide an activation force profile as desired. The activation force profile may be designed for particular applications, such as lightweight users, average weight users, or heavyweight users, for example. The activation force profile of the webbing 98 having the binder yarn pattern 96 is a gradual rate of activation force increase from a minimum activation force at the end 106 to a maximum activation force at area 108 where all of the binder yarns are interlocked with the top and bottom layer load-bearing webs 12, 24. Of course, the present invention provides for other activation force profiles.

The webbings of the present invention can be made of any materials suitable for webbings, including materials suitable for lanyards. For example, the webbings can be made of synthetic materials, such as synthetic material yarns woven to form the webbings. Also, the webbings could include elongation members, such as POY webbing or POY yarns (partially oriented yarns) for example, if desired.

The webbings of the present invention can be used in a wide variety of applications. For example, the webbings can be used as shock absorbing lanyards for safety harnesses. Shock absorbing lanyards according to the present invention can stop a person's fall while absorbing at least some of the shock force due to the stop of the fall that would otherwise be felt by the person.

Figure 13:
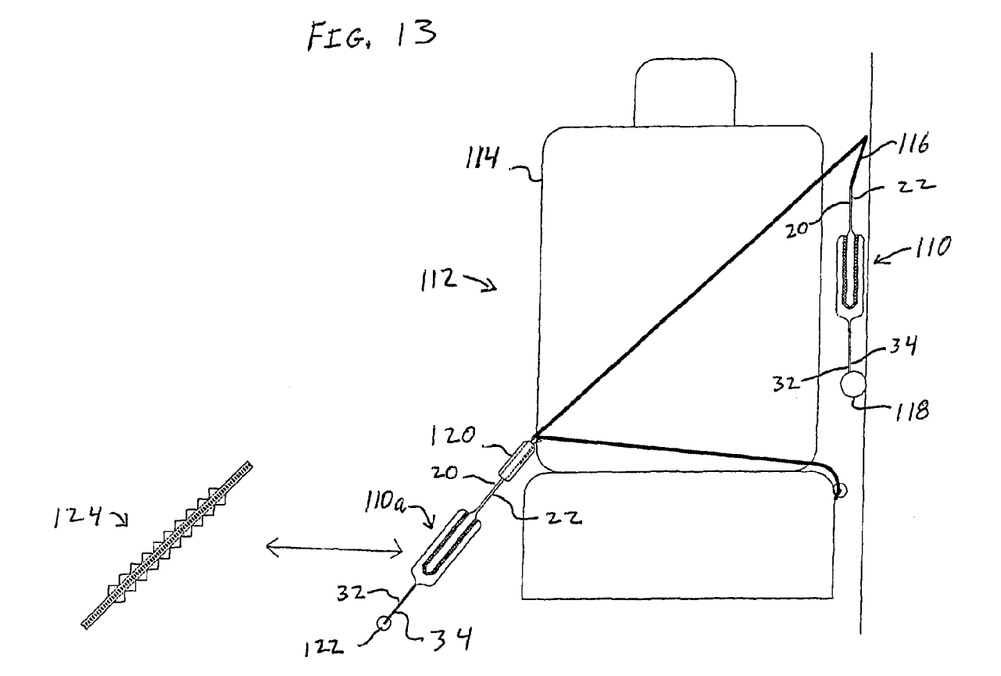
FIG. 13 is a schematic illustration of a load limiter and a seat belt system.

FIG. 13 shows an example of a load limiter 110 having the energy absorbing webbing 72 shown in FIG. 7. The load limiter 110 is used on a seatbelt system 112 for a passenger seat 114. One or more load limiters 110 may be used with the seat belt system 112 as desired, for example the load limiter 110a may also be used with the seatbelt system 112. The load limiter 110 has a structure similar to the lanyard 73 of FIG. 8.

The load limiter 110 has web ends 20, 22 (see also, FIG. 7) connected to a portion of the shoulder seatbelt strap 116. At the opposite end of the load limiter 110, web ends 32, 34 (see also FIG. 7) are connected to a fixed anchor point 118. Similarly, the load limiter 110a has web ends 20, 22 connected to a seatbelt buckle 120. The load limiter 110a has web ends 32, 34 connected to a fixed anchor point 122. Although the load limiters 110, 110a are shown connected to fixed anchor points 118, 122, the load limiters may be connected to the seatbelt system 112 in other arrangements as desired.

Figure 14:
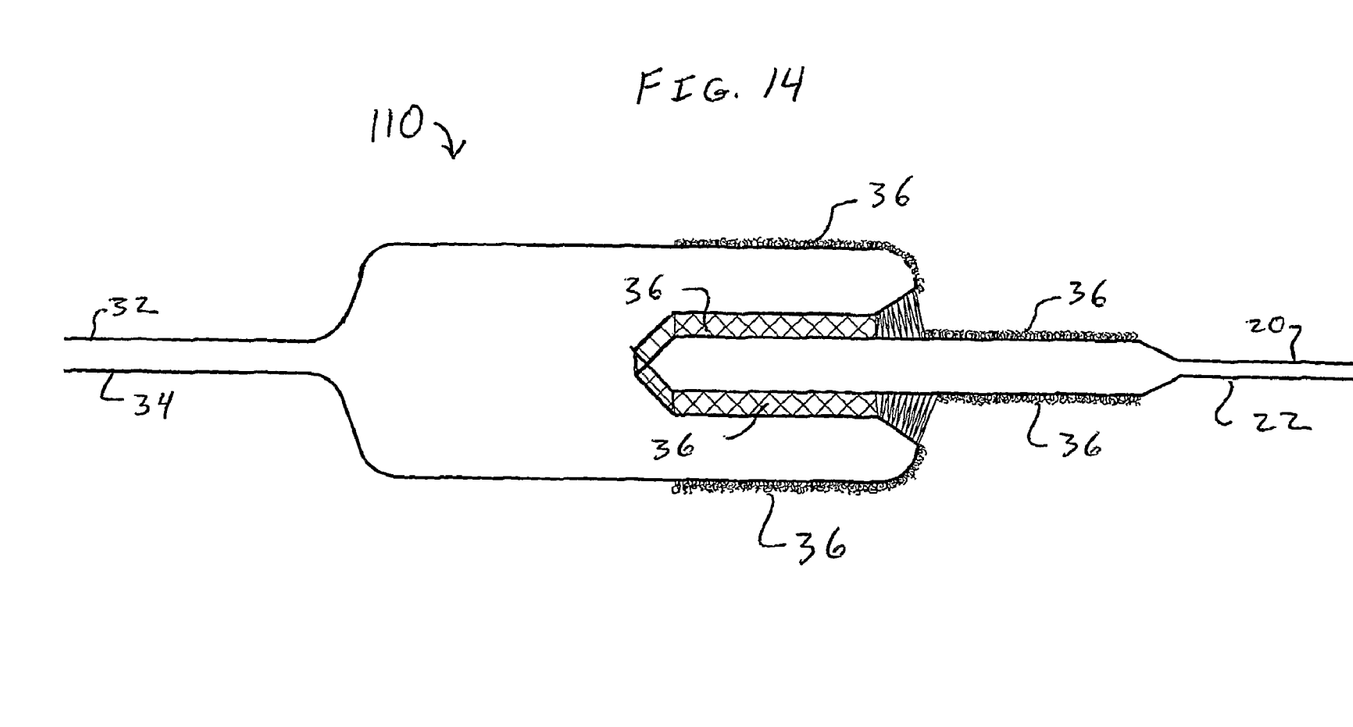
FIG. 14 is a schematic illustration of the load limiter of FIG. 13 during activation.

The load limiters 110, 110a operate to absorb energy as discussed above with regards to other embodiments of the invention. For example, FIG. 14 shows the load limiter 110 during activation. When a force of sufficient magnitude is applied to the load limiter 110, the binding material in the tear-away section breaks and absorbs energy. The load limiters 110, 110a and the seatbelt system 112 can reduce the shock applied to a passenger sitting in the passenger seat 114 when a vehicle abruptly slows down or comes to a stop. The load limiters 110, 110a are described as having the energy absorbing webbing 72 described above. However, other embodiments of the present invention can also be suitable for use in the load limiters. Other energy absorbing structures which absorb energy are also suitable for use with the seatbelt system 110 or the load limiters. By way of example, the disclosures in U.S. patent application Ser. No. 10/790,394 filed Mar. 1, 2004 incorporated herein by reference can also be suitable for the load limiters. One alternative load limiter made according to the disclosure in patent application Ser. No. 10/790,394 is load limiter 124.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A shock absorbing fabric structure, comprising:
   (a) a first web having a left first web end and a right first web end;
   (b) a second web having a left second web end and a right second web end;
   (c) a plurality of binder members connecting portions of the first web and the second web to form an energy absorbing portion, the binder members configured to fail upon application of a predetermined tensile load to the shock absorbing fabric structure;
   wherein the first web and the second web are folded and twisted relative to each other such that the left first web end and the right second web end are positioned with respect to each other to form a first shock absorbing fabric structure end and the right first web end and the left second web end are positioned with respect to each other to form a second shock absorbing fabric structure end; and
   whereby the binder members are configured to allow, upon application of the predetermined tensile load to the first shock absorbing fabric structure end and the second shock absorbing fabric structure end, at least part of the first web of the energy absorbing portion to separate from the second web of the energy absorbing portion thereby absorbing at least some shock associated with the predetermined tensile load.

2. The shock absorbing fabric structure of claim 1, wherein the binder members are binder yarns interlaced with the first and second webs.

3. The shock absorbing fabric structure of claim 1, wherein upon application of the predetermined tensile load, the binder members are configured to allow the first web to separate completely from the second web and wherein upon separation of the first web from the second web, the first and second webs both support the predetermined tensile load applied to the shock absorbing fabric structure.

4. The shock absorbing fabric structure of claim 1, wherein the energy absorbing portion has a first and second end, wherein the first end of the energy absorbing portion is adjacent to the first shock absorbing fabric structure end and the second end of the energy absorbing portion is adjacent to the second shock absorbing fabric structure end.

5. The shock absorbing fabric structure of claim 1, wherein failure of the binder members starts at opposite ends of the energy absorbing portion and continues from both opposite ends toward a center of the energy absorbing portion.

6. The shock absorbing fabric structure of claim 1, wherein the number of binder members connected to the first and second webs varies along the energy absorbing portion.

7. The shock absorbing fabric structure of claim 6, wherein the energy absorbing portion has a beginning fracture location and an ending fracture location, and wherein there are fewer binder members connected to the first and second webs adjacent the beginning fracture location than binder members connected to the first and second webs adjacent the ending fracture location.

8. The shock absorbing fabric structure of claim 1, wherein the first and second webs are selected from the group consisting of woven materials, knitted materials and combinations thereof.

9. A shock absorbing fabric structure, comprising:
   (a) a top layer web having yarns and having a left first web end and a right first web end;
   (b) a bottom layer web having yarns and having a left second web end and a right second web end;
   (c) a plurality of binder yarns connecting portions of the top and bottom layer webs to form an energy absorbing portion, the binder yarns configured to fail upon application of a predetermined tensile load to the shock absorbing fabric structure;
   (d) the top and bottom layer webs and the binder yarns formed together as a one-piece webbing;
   (e) the left first web end of the top layer web and the right second web end of the bottom layer web being positioned with respect to each other to form a first shock absorbing fabric structure end;
   (f) the left second web end of the bottom layer web and the right first web end of the top layer web being positioned with respect to each other to form a second shock absorbing fabric structure end; and
   (g) whereby the binder yarns are configured to allow, upon application of the predetermined tensile load to the first shock absorbing fabric structure end and the second shock absorbing fabric structure end, at least part of the top layer web of the energy absorbing portion to separate from the bottom layer web of the energy absorbing portion thereby absorbing at least some shock associated with the predetermined tensile load.

10. The shock absorbing fabric structure of claim 9, wherein the top and bottom layer webs are selected from the group consisting of woven materials, knitted materials and combinations thereof.

11. The shock absorbing fabric structure of claim 9, wherein the binder yarns are integrally interlocked with the yarns of the top and bottom layer webs.

12. The shock absorbing fabric structure of claim 9, wherein upon application of the predetermined tensile load, the binder yarns are configured to allow the top layer web to separate completely from the bottom layer web and wherein upon separation, the top and bottom layer webs both support the predetermined tensile load applied to the shock absorbing fabric structure.

13. The shock absorbing fabric structure of claim 9, wherein the top and bottom layer webs exchange with each other such that yarns of the top layer web change from a top side of the shock absorbing fabric structure to a bottom side of the shock absorbing fabric structure, and yarns of the bottom layer web change from the bottom side of the shock absorbing fabric structure to the top side of the shock absorbing fabric structure.

14. The shock absorbing fabric structure of claim 13, wherein the top and bottom layer webs exchange within the energy absorbing portion.

15. A tear-away shock absorbing fabric structure, comprising:
   a first web having a left first web end and a right first web end;
   a second web having a left second web end and a right second web end; and
   a plurality of binder members connecting the first and second webs together at an energy absorbing portion of the tear-away shock absorbing fabric structure;
   wherein the first web and the second web are folded and twisted relative to each other such that the left first web end of the first web is connected to the right second web end of the second web and the right first web end of the first web is connected to the left web second end of the second web.

16. The tear-away shock absorbing fabric structure of claim 15, wherein the first and second webs and the binder members are formed integrally as a one-piece shock absorbing fabric structure.

17. The tear-away shock absorbing fabric structure of claim 15, wherein the binder members are binder yarns interlocked with yarns of the first and second webs.

18. A tear-away shock absorbing fabric structure, comprising:
- a top side web having a left first web end and a right first web end;
- a bottom side web having a left second web end and a right second web end;
- an exchange portion where a portion of the yarns of the top side web exchanges with a portion of the yarns of the bottom side web; and
- binder members connecting the top and bottom side webs together at an energy absorbing portion of the tear-away shock absorbing fabric structure;
- the left first web end of the top side web connected to the right second web end of the bottom side web; and
- the left second web end of the bottom side web connected to the right first web end of the top side web.

19. The tear-away shock absorbing fabric structure of claim 18, wherein the exchange portion is within the energy absorbing portion.

20. The tear-away shock absorbing fabric structure of claim 18, wherein the top and bottom side webs and the binder members are formed integrally as a one-piece shock absorbing fabric structure.

21. The tear-away shock absorbing fabric structure of claim 18, wherein the binder members are fracturable binder yarns.

22. The tear-away shock absorbing fabric structure of claim 18, wherein the binder members are binder yarns interlocked with yarns of the top and bottom side webs.

23. The tear-away shock absorbing fabric structure of claim 18, wherein the binder members are fracturable binder yarns.

24. The tear-away shock absorbing fabric structure of claim 18, wherein in the exchange portion, the top side web changes from a top side of the tear-away shock absorbing fabric structure to a bottom side of the tear-away shock absorbing fabric structure, and the bottom side web changes from the bottom side of the tear-away shock absorbing fabric structure to the top side of the tear-away shock absorbing fabric structure.

25. The tear-away shock absorbing fabric structure of claim 24, wherein:
- the top side of the tear-away shock absorbing fabric structure has a left web end and a right web end;
- the bottom side of the tear-away shock absorbing fabric structure has a left web end and a right web end;
- the left and right web ends of the top side are positioned with respect to one another; and
- the left and right web ends of the bottom side are positioned with respect to one another.

26. The shock absorbing fabric structure of claim 9, wherein the top layer and bottom layer webs have ground yarns, and the ground yarns of the top layer web exchange with the ground yarns of the bottom layer web.

27. The shock absorbing fabric structure of claim 26, wherein:
- a top side of the shock absorbing fabric structure has a left web end and a right web end;
- a bottom side of the shock absorbing fabric structure has a left web end and a right web end;
- the left and right web ends of the top side are positioned with respect to one another;
- and the left and right web ends of the bottom side are positioned with respect to one another.

* * * * *

UNITED STATES PATENT AND TRADEMARK OFFICE
CERTIFICATE OF CORRECTION

| | | |
|---|---|---|
| PATENT NO. | : 7,726,350 B2 | Page 1 of 1 |
| APPLICATION NO. | : 12/063960 | |
| DATED | : June 1, 2010 | |
| INVENTOR(S) | : John E. Jennings et al. | |

It is certified that error appears in the above-identified patent and that said Letters Patent is hereby corrected as shown below:

In column 12, line 62, in claim 15, delete "web second" and insert -- second web --, therefor.

In column 13, line 34, in claim 23, delete "claim 18," and insert -- claim 15, --, therefor.

In column 14, line 32, in claim 27, before "the left" delete "and" and insert the same on Col. 14, Line 31 after "another,".

Signed and Sealed this
Tenth Day of May, 2011

David J. Kappos
*Director of the United States Patent and Trademark Office*